United States Patent
Cadeddu et al.

(10) Patent No.: US 8,292,051 B2
(45) Date of Patent: Oct. 23, 2012

(54) VALVE FOR DISCONNECTING THE FRONT BRAKING AND/OR THE TRAILER BRAKING, FOR A FARM TRACTOR OR A SIMILAR VEHICLE

(75) Inventors: Leonardo Cadeddu, Crema (IT); Luigi Alberti, Cremosano (IT)

(73) Assignee: VHIT S.p.A., Offanengo (IT)

( * ) Notice: Subject to any disclaimer, the term of this patent is extended or adjusted under 35 U.S.C. 154(b) by 1092 days.

(21) Appl. No.: 12/280,798

(22) PCT Filed: May 10, 2007

(86) PCT No.: PCT/EP2007/004267
§ 371 (c)(1),
(2), (4) Date: Aug. 27, 2008

(87) PCT Pub. No.: WO2007/131758
PCT Pub. Date: Nov. 22, 2007

(65) Prior Publication Data
US 2009/0071778 A1      Mar. 19, 2009

(30) Foreign Application Priority Data

May 16, 2006  (IT) ............................... TO2006A0353
Jan. 31, 2007  (IT) ............................... TO2007A0068

(51) Int. Cl.
*B60T 11/21* (2006.01)
(52) U.S. Cl. .......... 188/345; 188/349; 303/9.61; 60/591
(58) Field of Classification Search .................. 188/345, 188/349; 303/9.62, 9.61, 7, 84.2, 186–189; 60/562, 56, 567, 591
See application file for complete search history.

(56) References Cited

U.S. PATENT DOCUMENTS

| | | | | |
|---|---|---|---|---|
| 3,120,244 A * | 2/1964 | Hahn | ......................... | 137/512.5 |
| 3,520,577 A * | 7/1970 | Moyes | ......................... | 303/84.2 |
| 3,640,067 A | 2/1972 | Ingram | | |
| 3,863,991 A * | 2/1975 | Wilson | ......................... | 303/9.61 |
| 4,457,562 A * | 7/1984 | Pickenhahn | .................. | 303/9.65 |
| 4,547,967 A * | 10/1985 | Reynolds et al. | .................. | 303/7 |
| 4,702,330 A * | 10/1987 | Vatter et al. | .................... | 180/6.2 |
| 7,448,697 B2 * | 11/2008 | Brancolini | .................. | 303/9.61 |
| 2003/0071517 A1* | 4/2003 | Weil | .............................. | 303/9.61 |
| 2008/0164113 A1* | 7/2008 | Cadeddu et al. | .............. | 188/345 |

FOREIGN PATENT DOCUMENTS

| | | | | |
|---|---|---|---|---|
| DE | 36 15 045 A1 | 11/1987 | | |
| EP | 159793 A1 * | 10/1985 | ...................... | 60/562 |
| GB | 2 140 111 A | 11/1984 | | |
| WO | 2006/103049 A1 | 10/2006 | | |

* cited by examiner

*Primary Examiner* — Robert A Siconolfi
*Assistant Examiner* — Mariano Sy
(74) *Attorney, Agent, or Firm* — Young & Thompson (57) ABSTRACT

A valve intended to disconnect, in specific circumstances, the braking of the front wheels, and/or of a trailer whose braking system is connected through a trailer braking valve, for the braking system of a farm tractor or similar vehicle which includes two master cylinders, operated by two separate braking pedals, directly controlling the braking of the rear wheels, and controlling the braking of the front wheels and/or the braking device of the trailer through the disconnection valve. The disconnection valve includes a body, first and second inlet connections connected to the two master cylinders, and a delivery connection connected to a braking circuit of the front wheels and/or to the trailer brake valve. The valve body has a bore wherein is installed one movable piston subjected to the action of pressure applied to the first inlet connection.

18 Claims, 5 Drawing Sheets

VALVE FOR DISCONNECTING THE FRONT BRAKING AND/OR THE TRAILER BRAKING, FOR A FARM TRACTOR OR A SIMILAR VEHICLE

BACKGROUND OF THE INVENTION

1. Field of the Invention

This invention concerns a valve intended to disconnect, in special circumstances, the braking of the front wheels and/or of the trailer, in a farm tractor or in a similar vehicle.

2. Description of the Related Art

In certain vehicles, particularly farm tractors and similar vehicles, the hydraulic braking system includes two master cylinders controlled by two separate braking pedals, and each master cylinder controls the braking of one of the rear wheels of the vehicle. This arrangement aims to allow a differential braking of the rear wheels, for example in order to facilitate the vehicle rotation for the U-turn during the cultivation of a field along adjacent lanes which are run in alternatively opposite directions. When a bilateral braking is effected by operating both the braking pedals, in general the system would not be balanced because the two separate braking circuits take up different oil quantities, and also the braking would then not be balanced. In order to prevent this disadvantage, a transfer channel is arranged for mutually communicating the two braking systems when both braking pedals are simultaneously operated. This balancing operation is effected by valves inserted on the pistons of the master cylinders, which valves are normally closed and are opened when the pistons run along a preestablished stroke.

Figure 1:
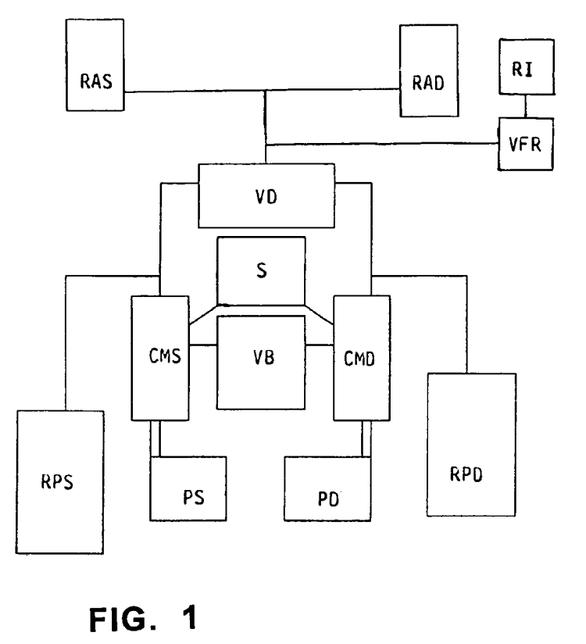
FIG. 1 shows the block diagram of a braking system of the considered kind.
Figure 2:
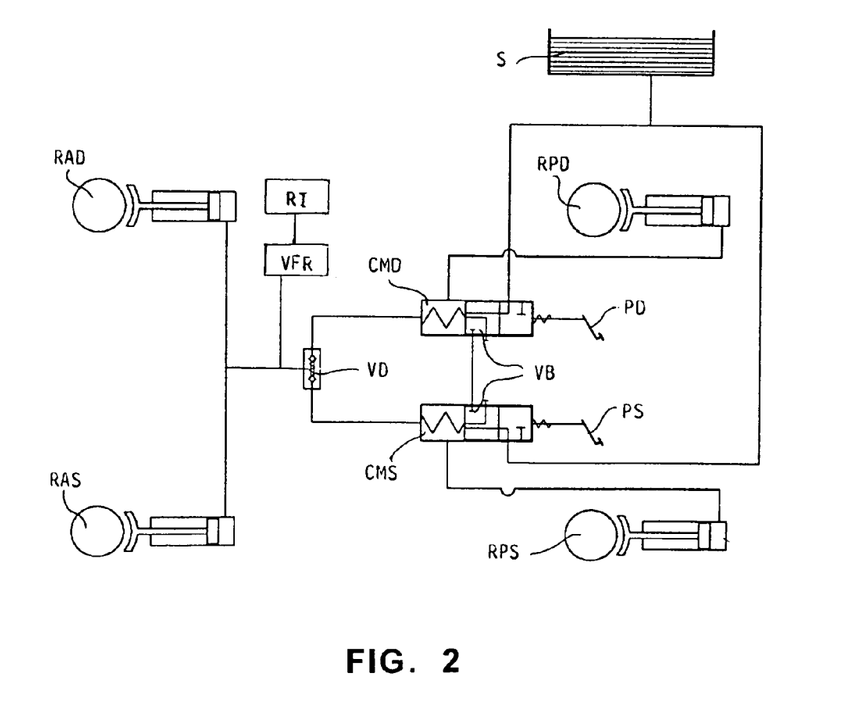
FIG. 2 shows the hydraulic diagram of the same braking system.

The vehicles equipped with the above system may be devoid of brake devices acting on the front wheels and of brake devices in the trailer possibly dragged. However, some systems are provided with brake devices also acting on the front wheels and/or with brake devices in the trailer, operated through a valve named "trailer brake valve", and in this case the systems comprise a hydraulic disconnecting valve intended to disconnect the braking of the front wheels and/or of the trailer in those cases in which only one braking pedal is operated, whereas, when both braking pedals are simultaneously operated, all the four wheels of the vehicle and/or the trailer wheels are braked. The block diagram of such a braking system is represented in FIG. 1, and the corresponding hydraulic diagram is represented in FIG. 2. This system will be described with more details later on.

Figure 3:
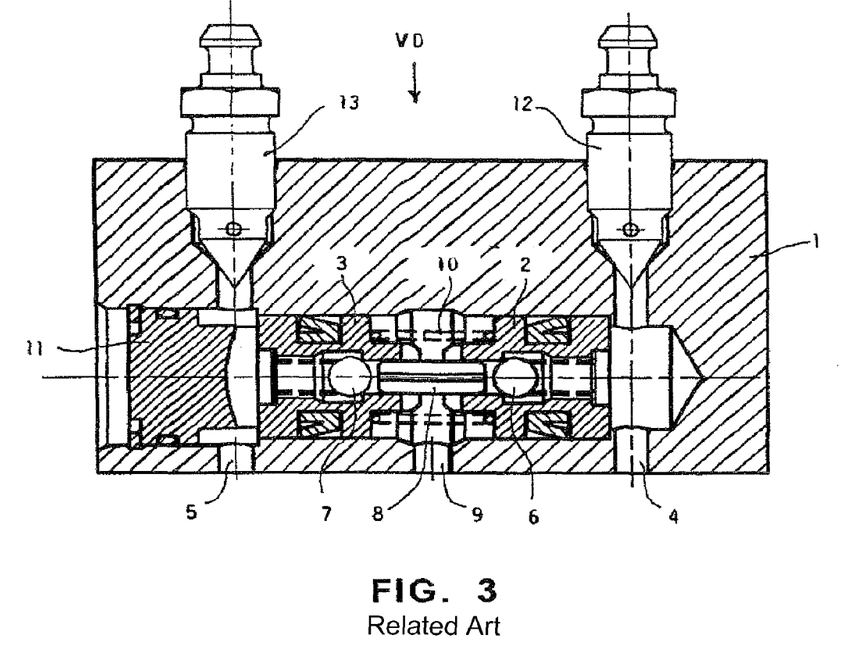
FIG. 3 shows the cross section of a disconnection valve embodied according to the known technique.
Figure 4:
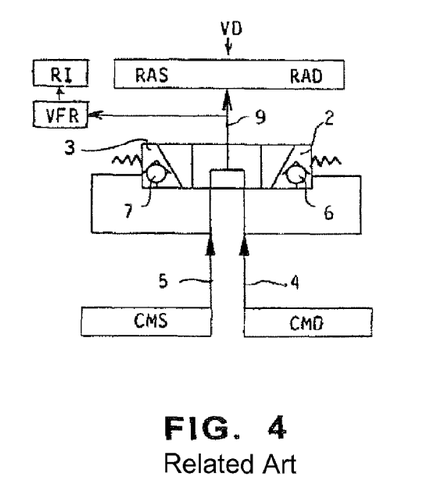
FIG. 4 shows the hydraulic diagram of the disconnection valve represented in FIG. 3.

A disadvantage of this kind of braking systems is that the hydraulic disconnection valve has a complicated structure, to which follow high manufacturing and assembling costs as well as relatively easy breakdowns. A typical example of the structure of this type of hydraulic disconnection valve is represented in FIG. 3, and its hydraulic diagram is represented in FIG. 4. This valve is described with more details later on.

Another drawback of the known systems is that the operations for exhausting the air from the hydraulic circuit when filling the same with oil involve rather complicated steps.

SUMMARY OF THE INVENTION

Therefore, the main object of the present invention is to substantially simplify the structure of the hydraulic valve intended for disconnecting the braking of the front wheels as well as of the trailer if present, in order to reduce the manufacturing and assembling costs and to render less probable the occurrence of breakdowns. Another object of the invention is to further improve this hydraulic valve in order to simplify the operations for the cleaning of the hydraulic circuit when the same is filled with oil. Other objects of this invention are stated later on.

The main object stated is attained, according to the invention, in a valve for disconnection of the braking of the front wheels and/or of the trailer if present, through a trailer brake valve, for a braking system of a vehicle having two pair of wheels all equipped with brake devices, or for a braking system of a vehicle having at least a pair of wheels equipped with brake devices and having a trailer brake valve, said vehicle having two master cylinders operating as pumps, each said master cylinder being operated by an own braking pedal, each said master cylinder directly controlling the braking of one rear wheel, and controlling the braking of the front wheels and/or of the trailer through a disconnection valve intended to disconnect the braking of the front wheels and of the trailer when only one of the braking pedals is operated, said disconnection valve comprising a body with a first and a second inlet connections intended to be connected each to one of the master cylinders, and comprising a delivery connection intended to be connected to a braking circuit of the front wheels, characterized in that:—said body has a first bore wherein is mounted a movable piston subjected to the action of the pressure applied to said first inlet connection;—said body comprises a normally closed interception valve closing a communication between said second inlet connection and said delivery connection;—and said movable piston has a member suitable for operating said interception valve in order to open the same when said movable piston is displaced by the pressure applied to said first inlet connection, then allowing communication between said second inlet connection and said delivery connection, and therefore allowing the application to said delivery connection of the pressure present in said second inlet connection.

Preferably, said interception valve is mounted along the displacement direction of said movable piston, and said movable piston has a pin directly acting onto said interception valve for opening the same.

It is of advantage that the disconnection valve comprises a second piston inserted in said body first bore, said second piston being fixed by a retainment member and supporting said interception valve.

Preferably, said interception valve is a ball valve provided with a spring which thrusts the valve towards the closure position.

Said first bore of the valve body may be closed at an end thereof by a plug, against which rests said movable piston in its inoperative position, towards which it is pushed. by a spring. Therefore this first bore is a blind bore.

Advantageously, said first bore of the valve body has several different diameters which decrease from an open end towards the opposite end, in order to allow inserting some packings by avoiding that these packings travel on holes or openings capable of damaging the packings at the time of the insertion thereof.

In a more developed embodiment, said plug is movable and it is provided with a clamping ring; between said movable plug and said clamping ring there is a spacing member suitable for keeping said movable piston in the position in which it opens the interception valve. Such spacing member is used when the braking circuit is filled with oil, and it is then removed for allowing the normal operation of the disconnection valve.

In this case, preferably said spacing member is shaped in such a manner that it is automatically expelled when a braking pressure is applied to the disconnection valve.

A further development of the invention has the purpose of also solving another problem present in the vehicles of the mentioned kind. Presently, in these vehicles, there is no optimal balancing between the braking torque applied to the rear wheels and the braking torques applied to the front wheels and to the trailer if present. It is needed to avoid that the front wheels may block with a great advance with respect to the rear wheels, an event which would involve difficulties or the impossibility of driving the vehicle. To this aim, the front brakes and the trailer brakes are underdimensioned. However, in this way the braking action is not optimal and, in certain conditions, as for example when traveling along an extensive slope, the rear brakes are excessively loaded and they undergo overheating.

Therefore, a further object of this invention is to improve the disconnection valve in order that it allows an optimization of the ratio between the different pressures applied to the different brakes of the vehicle, so that no brake requires to be underdimensioned, and the braking action applied to the different wheels may be adapted to the layout of the own vehicle charges and also to the charges due to implements and tools mounted on the vehicle. In other words, it is aimed to enable the disconnection valve to transmit to the front brakes of the vehicle, and to the brakes of the trailer if present, when the disconnection is not operated, a pressure proportionally reduced with respect to the pressure that is directly transmitted to the rear brakes of the vehicle.

Some devices are known that are intended to perform a proportional decrement of a pressure with the purpose of improve the braking actions, however the devices known to this aim are not suitable for being applied in the considered kind of vehicle, in which, when needed, should be effected the characteristic function of disconnection of the braking action.

Therefore the invention also concerns a valve for disconnecting the braking action, of the general kind above specified, which is characterized in that said movable piston has a second axial blind bore facing the first inlet connection, in that a tubular plunger is sealingly solid with the valve body and sealingly plunges in said second axial bore of the movable piston, in that said plunger defines at the bottom of said second axial blind bore a first chamber having the same cross section of said second bore and communicating through the passage of said tubular plunger with an external pressure, and in that said plunger defines in said first bore of the valve body an annular chamber communicating with said first inlet connection and having a cross section equal to the difference between the cross sections of said first and second bores; whereby the force applied to the movable piston by the pressure present in the first inlet connection is reduced, with respect to the product of said pressure present in the first inlet connection by the cross section of said first bore, according to a ratio resulting from the ratio between the cross sections of said first and second bores and from the ratio between the pressure present in said first inlet connection and the external pressure, and the pressure transmitted by the disconnection valve to said delivery connection is reduced, with respect to the pressure present in said second inlet connection, according to said resulting ratio.

Said external pressure may be the atmospheric pressure, and in this case said resulting ratio is invariable: it corresponds to the ratio between the cross sections of said first and second bores.

It may be understood that, by choosing the geometry of a disconnection valve having these features, it is possible to obtain that the braking action transmitted to the front brakes and/or to the trailer is reduced, with respect to the braking action transmitted to the rear brakes, according to a ratio which is considered optimal in view of the characteristics of the vehicle and of the distribution of its charges. However, according to this embodiment, said ratio is defined by the structural characteristics of the disconnection valve and it cannot be modified.

According to a further embodiment, a push shaft passes through the passage of the tubular plunger and rests against said movable piston, and a mechanical thrust device is foreseen for applying to said push shaft an adjustable force and therefore for transmitting this adjustable force to the movable piston. The mechanical thrust device may comprise a spring, whose compression may be adjusted by means of a control means such as a control wheel with a screw shaft.

In this case, by modifying under control the thrust applied by the spring to the thrust shaft and to the movable piston, is correspondingly reduced the action of the return spring of the movable piston that acts against the action of the pressure present in the first inlet connection, and therefore it is possible to modify the behavior of the disconnection valve in order to adapt the same to the needs of a specific vehicle or to specific charge conditions of this vehicle.

According to a further embodiment, the external pressure acting in said first chamber defined in said second bore is not the atmospheric pressure, but a pressure coming from an external adjustable pressure source. In this case, by modifying the value of the external pressure, is correspondingly modified the resulting ratio according to which is reduced the pressure coming from the second inlet connection for applying a pressure to the delivery connection. Therefore, also in this case it is possible to modify the behavior of the disconnection valve in order to adapt the same to the needs of a specific vehicle or to specific charge conditions of this vehicle.

The modification of the value of the external pressure may be effected by a manual control, or it may be automatically controlled by a system suitable for estimating the charge conditions of the vehicle and for adapting to the same the braking control effected by the disconnection valve.

BRIEF DESCRIPTION OF THE DRAWING FIGURES

These and other characteristics, objects and advantages of the subject of the present invention will appear more clearly from the following description of some embodiments, having the character of non limiting examples, with reference to the appended drawings, wherein.

DETAILED DESCRIPTION OF THE INVENTION

In order to remind the type of braking system considered here, FIG. 1 shows the block diagram of such a system, of the kind wherein all the wheels are provided with braking devices, and FIG. 2 shows the hydraulic diagram of the same system. The vehicle has four wheels: a left front wheel RAS with its own braking device, a right front wheel RAD with its own braking device, a left rear wheel RPS with its own braking device, and a right rear wheel RPD with its own braking device. It may be present a trailer RI, whose wheels are braked through a trailer brake valve VFR. The braking of all these wheels is to be controlled by means of two braking pedals, a left pedal PS and a right pedal PD. To this purpose, the left pedal PS is connected to a left master cylinder CMS, which receives oil from a reservoir S and, when the left pedal PS is operated, sends oil under pressure to the braking device of the left rear wheel RPS as well as to a disconnection valve VD intended to disconnect the braking of the front wheels and of the trailer if present. In a similar manner, the right left pedal PD is connected to a right master cylinder CMD, which receives oil from a reservoir S (in this case, the same reservoir which supplies the left master cylinder CMS) and, when the right pedal PD is operated, sends oil under pressure to the braking device of the right rear wheel RPD as well as to the disconnection valve VD intended to disconnect the braking of the front wheels and of the trailer if present. The disconnection valve VD (to which the present invention specifically refers) has the purpose of disconnecting the braking of the front wheels RAS and RDS and/or of the trailer RI when only one of the pedals PS and PD is operated.

The two pedals PS and PD, when singularly operated, allow to brake the only rear vehicle wheel which is situated on the same side as the operated pedal. The simultaneous operation of both pedals PS and PD allows to brake all the vehicle wheels.

In order to balance the braking action in this latter case, a balancing valve VB is interposed between the two master cylinders CMS and CMD and it equalizes the hydraulic pressures sent to the various wheels when both pedals PS and PD are simultaneously operated. This balancing valve VB comprises component parts included in the master cylinders CMS and CMD.

In one of the known embodiments, whose cross section is represented in FIG. 3 and whose hydraulic diagram is represented in FIG. 4, a disconnection valve VD for disconnecting the braking of the front wheels and of the trailer if present comprises a body 1 with a bore wherein there are inserted two pistons 2 and 3 on which act the hydraulic pressures generated, respectively, by the master cylinder CMS and by the master cylinder CMD. These pressures are brought to the disconnection valve VD through respective inlet connections 4 and 5. In the pistons 2 and 3 are inserted ball valves, respectively 6 and 7, which are normally closed by respective springs and can be opened by a spacing member 8. The spacing member 8 is freely installed between the valves 6 and 7, and it is suitable for acting onto the valves when the two pistons 2 and 3 are displaced in mutual approach, thus opening the valves 6 and 7 (or at least one of them) for allowing the pressures coming from the inlet connections 4 and 5 to reach a delivery connection 9. The delivery connection 9 supplies the braking devices of the front wheels and/or of the trailer RI if present, through the trailer brake valve VFR. A spring 10 thrusts the pistons 2 and 3 to move mutually away, for their return to the rest positions when the pressures coming from the inlet connections 4 and 5 tend to zero. A plug 11 closes the entrance of the bore wherein the pistons 2 and 3 are inserted. Two cleaning valves 12 and 13 are put in communication with the inlet connections 4 and 5 for allowing the exhausting of the air present in the valve, at the time of its installation and then each time this exhaust is needed.

The operation of the represented valve is as follows. When an unilateral braking is effected-by operating only one of the braking pedals PS and PD, only one of the two master cylinders CMS and CMD sends a pressure to the corresponding braking device of the rear wheel RPS or RPD, and also to the corresponding inlet connection 4 or 5 of the disconnection valve VD. Then the corresponding piston 2 or 3 advances towards the other piston 3 or 2, and its ball valve 6 or 7, after having contacted the spacing member 8, pushes this spacing member 8 against the other ball valve 7 or 6. The ball valve of the piston to which the pressure is applied is kept closed by this pressure, whereas the other ball valve, on which no pressure acts, is opened by the spacing member, but this opening gives no effect in the absence of a pressure. Therefore the pressure sent in this manner to the disconnection valve VD cannot reach the- delivery connection 9, and the braking of the front wheels and/or of the trailer is not operated. As a consequence, in this situation only one rear wheel is braked.

On the contrary, when a bilateral braking is effected by operating simultaneously both braking pedals PS and PD, both master cylinders CMS and CMD send a pressure to the corresponding braking device of the rear wheel RPS and RPD, and also to the corresponding inlet connection 4 and 5 of the disconnection valve VD. Then both pistons 2 and 3 mutually approach, and at least one of the ball valves 6 and 7 (or both), having contacted the spacing member 8, is (are) opened by this spacing member against the action of their springs and of the pressures acting onto the ball valves. Therefore, at least one of the pressures sent to the disconnection valve VD reaches the delivery connection 9, and the braking of the front wheels (as well as of the trailer RI if present, through the trailer brake valve VFR) is activated. As a consequence, all the four wheels of the vehicle, and the wheels of the trailer, if present, are braked.

The observation of FIG. 3 allows realizing how the structure of the disconnection valve VD, when embodied according to the known technique, is complicated in its manufacture and, therefore, also in its assemblage.

Figure 5:
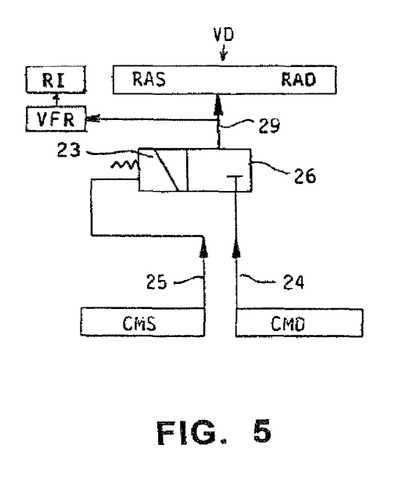
FIG. 5 shows the hydraulic diagram of a disconnection valve embodied according to the present invention.
Figure 6:
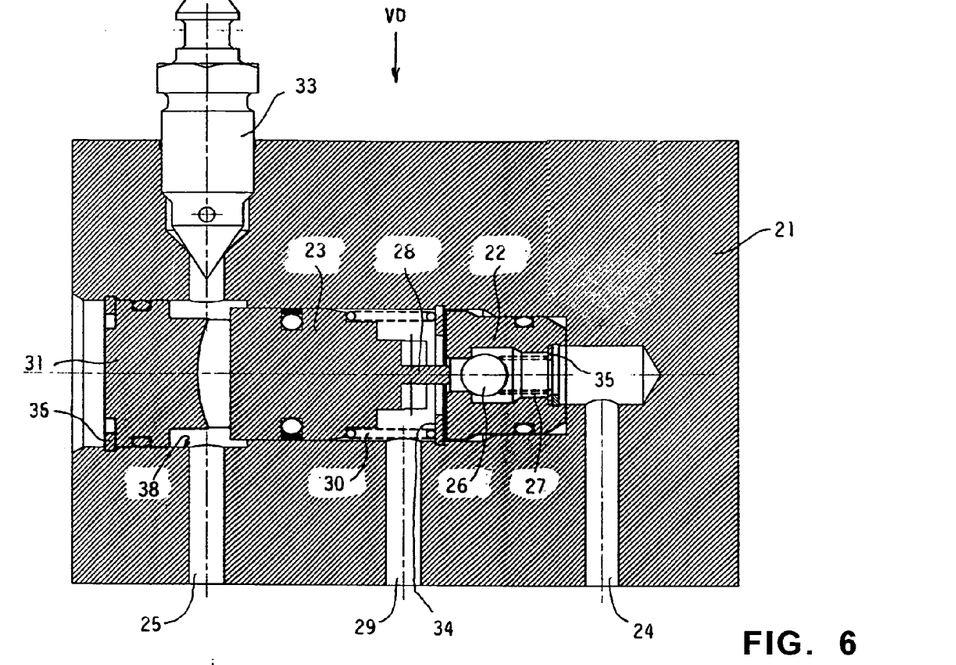
FIG. 6 shows the cross section of a first embodiment of the disconnection valve according to the present invention, in non-operating condition.

A first embodiment of a disconnection valve VD according to this invention is represented in FIG. 6, and its hydraulic circuit is represented in FIG. 5. The comparison between FIGS. 4 and 5 and between FIGS. 6 and 3 shows in evident manner how the disconnection valve embodied according to the invention is simplified with respect to the corresponding disconnection valve embodied according to the known technique.

In this first embodiment of the invention, the disconnection valve VO intended to disconnect the braking of the front wheels and/or of the trailer comprises a body 21 which has a first blind bore 38 wherein are inserted two pistons 22 and 23 onto which act the hydraulic pressures generated, respectively, by the master cylinders CMS and CMO, which enter the disconnection valve through inlet connections, respectively 24 and 25. Only in the piston 22 is inserted an interception ball valve 26, which is normally closed by a spring 27 resting against a clamping ring 35. The interception ball valve 26 can be opened by a pin 28 carried by the piston 23, in order to allow the pressure coming from the inlet connection 24 to reach a delivery connection 29 which supplies the braking devices of the front wheels and/or the trailer brake valve VFR and, consequently, the braking devices of the trailer RI.

A spring 30 pushes piston 23 away from piston 22 for reverting piston 23 to its rest position. Piston 22 is blocked in an unmovable position by a clamping ring 34. A plug 31 closes the entrance of the first bore wherein the pistons 22 and 23 are inserted. A valve 33 for cleaning is put in communication with the inlet connection 25 for allowing exhausting of the air present in the valve and in the braking circuit, when the valve is installed and then each time such operation is needed.

It is to be noted that according to the present invention only one cleaning valve is sufficient, instead of two cleaning valves that are needed in the known systems.

It is also to be noted that piston 22, blocked in an unmovable position by the clamping ring 34, has an only structural function for carrying a seat against which acts the ball valve 26 and carrying the ring 35 against which rests ring 27 of the ball valve 26. This arrangement is advantageous for the manufacture and assemblage of the valve, but it might be replaced by different arrangements wherein piston 22 may be omitted. For example, the seat for valve 26 might be carried directly by body 21 and a second plug could be provided, opposite plug 31, for closing a bore which in this case passes through the entire body 21.

Figure 7:
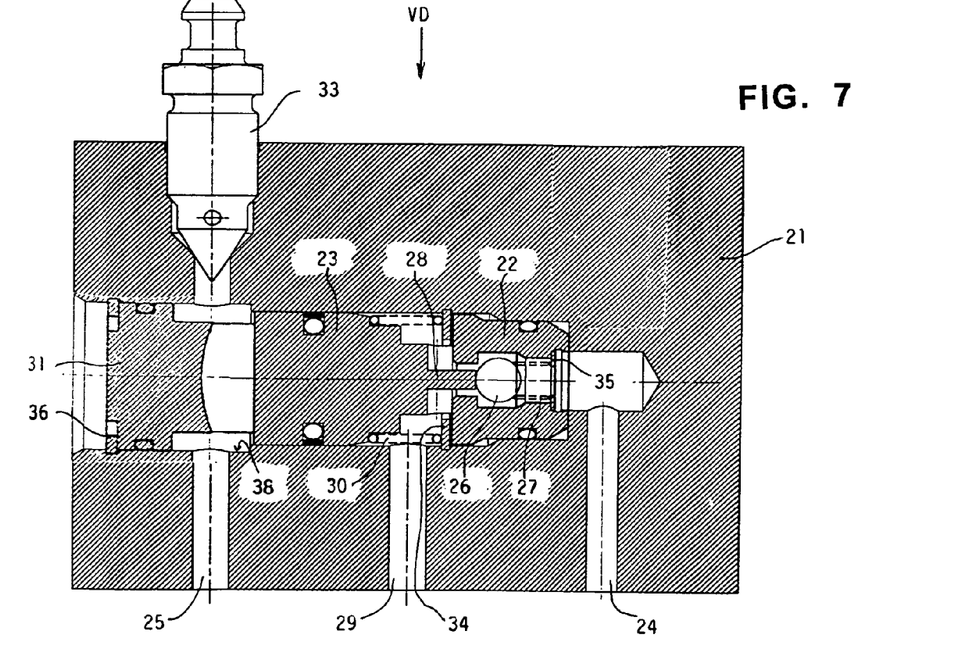
FIG. 7 shows the cross section of the disconnection valve of FIG. 6, in operating condition.
Figure 8:
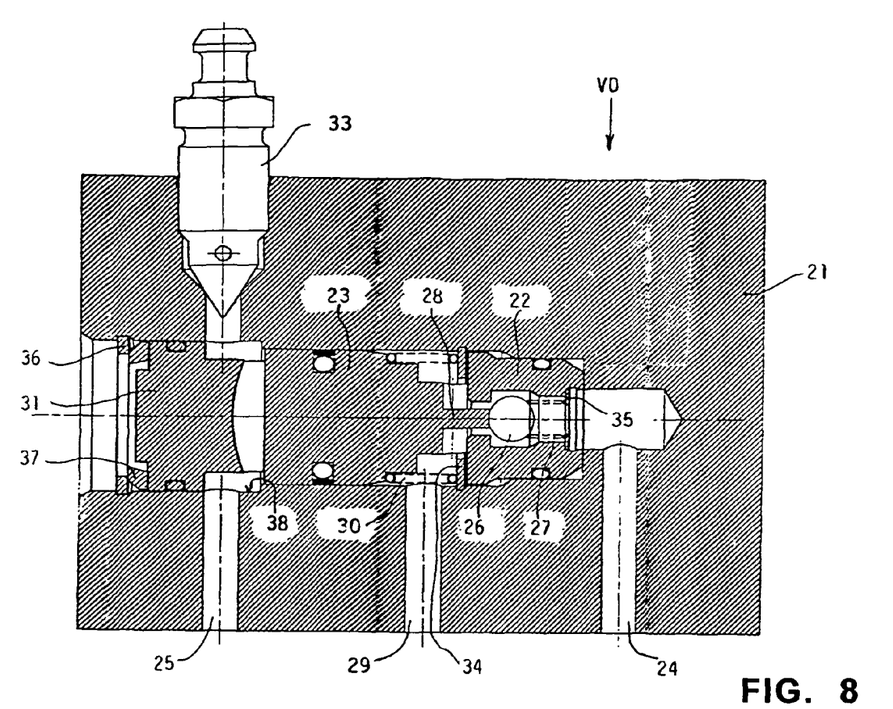
FIG. 8 shows a second embodiment wherein there is inserted a spacing member intended for rendering easier the filling of the system.

The operation of the disconnecting valve represented in FIGS. 6, 7 and 8 is as follows. When an unilateral braking is effected by operating only one of the braking pedals PS and PD, only one of the two master cylinders CMS and CMD sends a pressure to the corresponding braking device of the rear wheel RPS or RPD, and also to the corresponding inlet connection 24 or 25 of the disconnection valve VD. Then two different cases may occur:

In the case that only the braking pedal PS has been activated, the master cylinder CMD remains inactive, and the master cylinder CMS sends a pressure to the braking device of the corresponding rear wheel RPS and to the inlet connection 25 of the disconnection valve. This pressure displaces piston 23 against the action of spring 30. The pin 28 of piston 23 acts against the ball valve 26 and opens this valve against the action of spring 35. However, because the inlet connection 24 does not receive any pressure, no pressure is transmitted to the delivery connection 29, and the braking of the front wheels and/or of the trailer is not activated. As a consequence, only the rear wheel RPS is braked.

In the case that only the braking pedal PD has been activated, the master cylinder CMS remains inactive, and the master cylinder CMD sends a pressure to the braking device of the corresponding rear wheel RPD and to the inlet connection 24 of the disconnection valve. This pressure, however, cannot displace the piston 23, which is blocked by the clamping ring 34. The ball valve 26 remains closed, and no pressure is sent to the delivery connection 29, whereby also in this case the braking of the front wheels and/or of the trailer is not activated. As a consequence, only the rear wheel RPD is braked.

On the contrary, in the case that a bilateral braking is effected by simultaneously operating both the braking pedals PS and PD, both the master cylinders CMS and CMD send pressures to the corresponding braking devices of the rear wheels RPS and RPD and to the corresponding inlet connections 24 and 25 of the disconnection valve. Then the movable piston 23 moves towards the fixed piston 22 and the ball valve 26 is opened by the pin 22 of piston 23, against the actions of spring 27 and of the pressure present in the inlet connection 24. The action of the pressure present in the inlet connection 25 prevails on the action present in the inlet connection 24 because the pressure present in the inlet connection 25 is applied onto the section of piston 23, which is much larger than the section of the ball valve 26 which receives the action of the pressure present in the inlet connection 24. The position thus assumed by the parts is represented in FIG. 7. The pressure present in the inlet connection 24 reaches, through the open ball valve 26, the delivery connection 29, and the braking of the front wheels and/or of the trailer is activated. As a consequence, all the four wheels of the vehicle, and the trailer if present, are braked.

As it. may observed in FIG. 6, the first bore 38 is machined in the body 21 of the disconnection valve with three different diameters, which decrease from the entrance to the bottom. In this way the various packings intended to establish the seal of the component parts may be inserted from the bore entrance without sliding on holes or openings, and this reduces the possibility that the packings are damaged when mounting them.

The structure of the disconnection valve according to the invention is very simplified with respect to the known structure: one ball valve with its spring and the spacing member are suppressed, and the structure of the sole movable piston is very simple. The manufacture and the assemblage are more simple and less costly, the causes of possible breakdowns are reduced and thus a great reliability is attained.

FIG. 8 represent a second embodiment of a disconnection valve according to the invention, being an improvement of the first embodiment intended to render more easy the operation for exhausting air from the disconnection valve when the braking circuit is filled with oil. For this operation, a depression is applied to the circuit and the oil is introduced under pressure. In the present embodiment of the disconnection valve, between the plug 31 and a clamping ring 36 is. added a spacing ring 37 of plastics which keeps in an advanced position the plug 31 and therefore also the movable piston 23 which rests against plug 31. Then the pin 28 of the movable piston 23 keeps permanently in open position the ball valve 26. As a consequence the braking circuit of the front wheels, and/or the trailer brake valve if present, which are connected to the delivery connection 29, permanently communicate with the inlet connection 24 and therefore with the master cylinder CMD. In these conditions, a depression applied to a component part communicating with the braking circuit of the rear wheels, for example to the reservoir S, is transmitted to the whole circuit including the braking circuit of the front wheels and the trailer brake valve.

On the contrary, in the known braking circuits, the disconnection valve is normally closed and it does not allow a depression, applied to the braking circuit of the rear wheels or to the reservoir, to be transmitted to the braking circuit of the front wheels. As a consequence, before introducing oil under pressure it is needed to apply a depression to two different points of the braking circuit, namely a point communicating with the braking circuit of the rear wheels and another point communicating with the braking circuit of the front wheels. The operation required for a braking circuit including a disconnection valve according to the known technique is therefore substantially more complicated that the operation required for a braking circuit including a disconnection valve according to the present invention.

It may be remarked that a spacing member intended to render easy the filling operation of the system could also be added in the known disconnection valves.

When the system has been filled with oil, the spacing ring 37 can be eliminated in order to allow the normal operation of the disconnection valve. It is of advantage that the spacing ring 37 is shaped, for example with a sloping external surface as shown by FIG. 8, in such a way that it is automatically expelled by the pressure established inside the disconnection valve on the occasion of the first braking operation.

Figure 9:
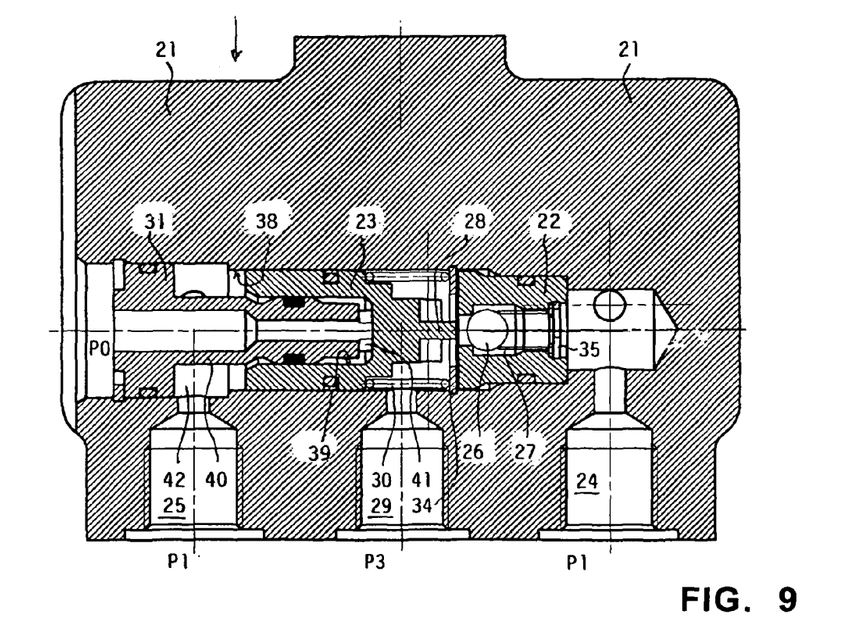
FIG. 9 shows a third embodiment which includes means for balancing the braking, these means being deprived of means for adjusting the operating conditions.

According to a third embodiment, represented in FIG. 9, the movable piston 23 has a second blind bore 39 whose entrance faces the first inlet connection 25, and a tubular plunger 40, sealingly solid with the body 21 of the disconnection valve, sealingly plunges in said second bore 39 of the movable piston 23. According to the example shown, the tubular plunger 40 is solid with the plug 31 which closes the first bore 38. The tubular plunger 40 defines, at the bottom of the second blind bore 39, a first chamber 41 whose cross section is equal to the cross section of said second bore 39. The first chamber 41 communicates, through the passage of said tubular plunger 40, with an external pressure P0. Moreover, the tubular plunger 40 defines in said first bore 39 of body 21, between the movable piston 23 and the plug 31, a second chamber 42, which is annular and communicates with said first inlet connection, 25. The annular chamber 42 has a cross section S3 equal to the difference between the cross section S1 of the first bore 38 and the section S2 of the second bore 39.

In the conditions of bilateral braking, both master cylinders CM8 and CMD send pressures to the inlet connections 24 and 25, and the pressures sent to the two inlet connections are both equal to a pressure P1, thanks to the presence in the system of a balancing valve. In the absence of the present embodiment of the invention, the force F1 applied to the movable piston by the pressure P1 present in the inlet connections 24 and 25 would be equal to the pressure P1 multiplied by the section 81 of the first bore 38. On the contrary, due to the presence of the structure of the present embodiment, the force F applied to the movable piston 23 is reduced, with respect to said force F1, according to a ratio R resulting from the ratio between the cross sections S1 and S2 of said first bore 38 and respectively of the second bore 39, and according to the ratio between the pressure P1 present in the inlet connections 24 and 25 and the external pressure P0. The movable piston 23 takes a position in which said force F is equilibrated by the sum of the force applied by the return spring 30 and of the force F3 resulting by the pressure P3 present in the delivery connection 29 multiplied by the surface S1 of the cross section of the first bore 38. The movable piston 23 opens the interception valve 26 only when said force F prevails on the force F3. Therefore, the pressure P3 transmitted by the disconnection valve VO to said delivery connection 29 is regulated on a value which is reduced, with respect to the pressure P1 present in said second inlet connection 24, according to said resulting ratio R. This ratio R is therefore the regulation ratio of the disconnection valve VO.

As already stated, the disconnection valve according to FIG. 9, as just described, has an invariable regulation ratio R. This regulation ratio may be adjusted to the need of a certain vehicle type and to the normal charge of the same, by adequately choosing the structural parameters of the disconnection valve, and in particular the surface S1 of the first bore 38 and the surface S2 of the second bore 39. Because the first chamber 41 communicates with the atmosphere, the pressure P0 therein present is invariable.

Referring now to the fourth embodiment of the invention, represented in FIG. 10, the component parts already described with reference to FIG. 9 remain unchanged, but through the passage of the tubular plunger 40 is introduced a push shaft 43 which rests against said movable piston 23. To this push shaft is applied an adjustable force by means of a mechanical thrust device comprising a spring 44. The compression of spring 44 may be adjusted by means of a control wheel 45 whose shaft 46 is screwed in a support member 47 solid with the body 21 of the disconnection valve. By means of this device it is possible to apply to the piston 23 an adjustable force which partly compensates for the force applied by the return spring 30. In this manner, the operation conditions of the disconnection valve VD, and in particular its intervention point, may be modified in order to adapt the same to a specific vehicle type or to the actual charge condition of this vehicle.

It is to be understood that the described mechanical thrust device is only an example, and that this device may be designed in various manners, either for allowing a continuous adjustment of the operation conditions of the disconnection valve, or for allowing a stepwise adjustment, namely the selection among two or more preestablished operation conditions, which may correspond, for example, to the condition of discharged vehicle, to the condition of normal charge and to the condition of heavy charge.

Figure 11:
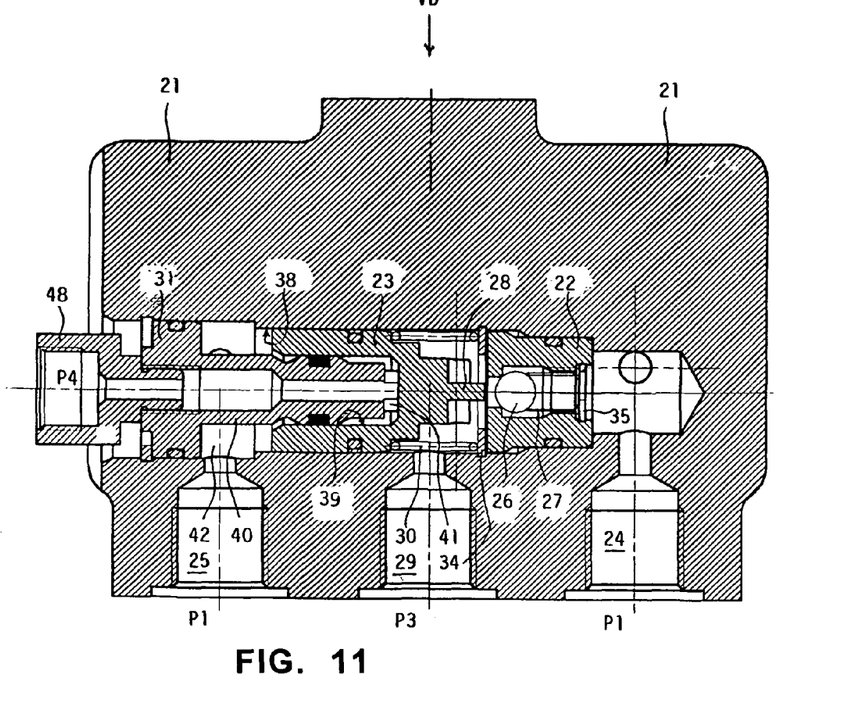
FIG. 11 shows a fifth embodiment which includes means for balancing the braking, these balancing means being provided with means for adjusting the operating conditions which operate by a modification of an external pressure.

A fifth embodiment of the invention is represented in FIG. 11. In this embodiment, the component parts already described with reference to FIG. 9 are unchanged, but the passage traversing the tubular plunger 40 has a connection 48 intended to transmit to the first chamber 41 a pressure P4 coming from an external pressure source connected to the connection 48. In this case, the force F applied to the movable piston 23 is reduced, with respect to the already cited force F1, according to a ratio RV resulting from the ratio between the cross sections S1 and S2 of said first bore 38 and respectively of the second bore 39, and according to the ratio between the pressure P1 present in said first inlet connections 25 and the adjustable external pressure P4, whereby the pressure P3 transmitted by the disconnection valve VD to said delivery connection 29 is reduced, with respect to the pressure P1 present in said second inlet connection 24, according to said resulting ratio RV.

In this case, by modifying the value of the external adjustable pressure P4, is also correspondingly modified the resulting ratio RV, which in this case is variable, according to which the pressure P1 coming from the second inlet connection 24 is reduced for its application to the delivery connection 29. Therefore, also in this case it is possible to modify the operation conditions of the disconnection valve VD, and in particular its regulation ratio RV, in order to adapt the same to a specific vehicle type or to specific charge condition of this vehicle.

It will be understood that the modification of the value P4 of the external pressure could be effected by a manual control. However it is of advantage that this modification is automatically effected by a control system suitable for evaluating the charge conditions of the vehicle and for adapting thereto the braking control operated by the disconnection valve.

Figure 10:
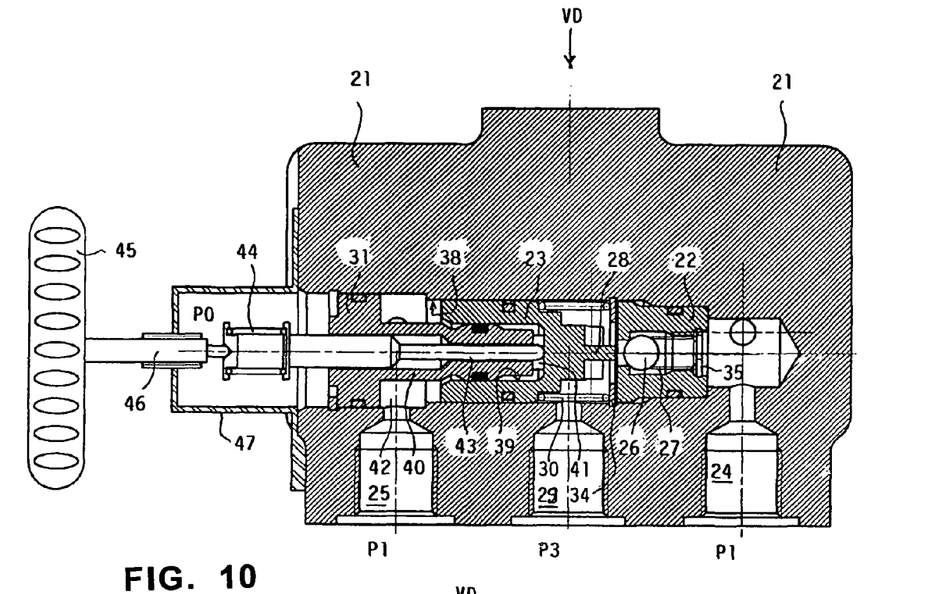
FIG. 10 shows a fourth embodiment which includes means for balancing the braking, these balancing means being provided with mechanical means for adjusting the operating conditions.

Of course, the devices intended to modify the behavior of the disconnection valve VD, namely a mechanical device according to FIG. 10 and a fluidical device according to FIG. 11, may also be adopted together.

It is to be understood that this invention is in no way limited by the embodiments described and represented as examples. Several possible modifications have been mentioned in the course of the description, and other modifications are within the capacity of those skilled in the art. These modifications and others, as well as any replacement by technically equivalent means, may be applied to what has been described and represented, without departing from the spirit of the invention and from the scope of this patent as defined by the appended Claims.

The invention claimed is:

1. A valve (VD) intended to disconnect, braking of at least one of front wheels (RAS,RAD) or a trailer (RI), the valve comprising:
a body (21);
a first inlet connection (25) and a second inlet connection (24) intended to be connected to two master cylinders (CMS,CMD), each master cylinder (CMS,CMD) being operated by a separate braking pedal (PS,PD), directly controlling braking of one rear wheel (RPS,RPD), and controlling braking of at least one of the front wheels (RAS,RAD) or a braking device of the trailer (RI) when only one braking pedal (PS,PD) is operated; and
a delivery connection (29) intended to be connected to at least one of a braking circuit of the front wheels (RAS, RAD) or to a trailer brake valve VFR, wherein
said body (21) has a first bore (38) in which is installed one first movable piston (23) subjected to the action of pressure applied to said first inlet connection (25);
said body (21) comprises a normally closed interception valve (26) closing a communication between said second inlet connection (24) and said delivery connection (29);
a second piston (22) inserted in said body first bore (38), said second piston (22) being fixed by a retainment member and supporting said interception valve (26); and
said movable piston (23) has a member (28) suitable for operating said interception valve (26) in order to open the interception valve (26) when said first movable piston (23) is displaced by the pressure applied to said first inlet connection (25), then allowing communication between said second inlet connection (24) and said delivery connection (29), and therefore allowing application to said delivery connection (29) of pressure present in said second inlet connection (24).

2. The disconnection valve as set forth in claim 1, wherein said interception valve (26) is mounted along the displacement direction of said movable piston (23), and said movable piston (23) has the member (28) which is a pin (28) directly acting onto said interception valve (26) for opening the interception valve (26).

3. The disconnection valve as set forth in claim 1, wherein said first bore (38) of the valve body (21) is closed at an end thereof by a plug (31), against which rests said movable piston (23) in its inoperative position, the movable piston (23) being pushed by a spring (30) towards said plug (31).

4. The disconnection valve as set forth in claim 3, wherein said first bore (38) of the valve body (21) has several different diameters which decrease from an open end thereof towards the opposite end.

5. The disconnection valve as set forth in claim 3, wherein said plug (31) is movable and is provided with a clamping ring (36), and that between said movable plug (31) and said clamping ring (36) there is a spacing member (37) suitable for keeping said movable piston (23) in the position in which it opens the interception valve (26), said spacing member (37) being used when the braking circuit is filled with oil, and being then removed for allowing the normal operation of the disconnection valve.

6. The disconnection valve as set forth in claim 5, wherein said spacing member (37) is shaped in such a manner that it is automatically expelled when a braking pressure is applied to the disconnection valve.

7. The disconnection valve as set forth in claim 1, wherein:
said movable piston (23) has a second axial blind bore (39) facing the first inlet connection (25),
a tubular plunger (40) is sealingly solid with the valve body (21) and sealingly plunges in said second axial bore (39) of the movable piston (23),
said plunger (40) defines at the bottom of said second axial blind bore (39) a first chamber (41) having the same cross section of said second bore (39) and communicating through the passage of said tubular plunger (40) with an external pressure (P0, P4),
and said plunger (40) defines in said first bore (38) of the valve body (21) an annular chamber (42) communicating with said first inlet connection (25) and having a cross section equal to the difference between the cross sections of said first (38) and second (39) bores; whereby the force (F) applied to the movable piston (23) by the pressure present in the first inlet connection (25) is reduced, with respect to the product (F1) of said pressure (P1) present in the first inlet connection (25) by the cross section of said first bore (39), according to a ratio (RV) resulting from the ratio between the cross sections of said first (38) and second (39) bores and from the ratio between a pressure (P1) present in said first inlet connection (25) and an external pressure (P0, P4), and the pressure transmitted by the disconnection valve to said delivery connection (29) is reduced, with respect to the pressure (P1) present in said second inlet connection (25), according to said resulting ratio (RV).

8. The disconnection valve as set forth in claim 7, wherein a push shaft (43) passes through the passage of the tubular plunger (40) and rests against said movable piston (23), and a mechanical thrust device (44-47) is foreseen for applying to said push shaft (43) an adjustable force and therefore for transmitting this adjustable force to the movable piston (23).

9. The disconnection valve as set forth in claim 8, wherein said mechanical thrust device (44-47) comprises a spring (44), whose compression may be adjusted by means for controlling or a control wheel (45) with a screw shaft (46).

10. The disconnection valve as set forth in claim 7, wherein a source of the external pressure (P0) acting in said first chamber (41) defined in said second bore (39) is atmospheric pressure, whereby said resulting ratio (R) is invariable and corresponds to the ratio between the cross sections of the first (38) and second (39) bores.

11. The disconnection valve as set forth in claim 7, wherein a source of the external pressure (P4) acting in said first chamber (41) defined in said second bore (39) is an adjustable pressure source, whereby said resulting ratio (RV) is variable and can be adapted to a specific type of vehicle and to its charge conditions.

12. The disconnection valve as set forth in claim 11, wherein a value of said external pressure (P4) is adjusted by means of a manual control.

13. The disconnection valve as set forth in claim 12, wherein a value of said external pressure (P4) is adjusted by means of an automatic control produced by a system suitable for evaluating the charge conditions of the vehicle and for adapting thereto the braking control effected by the disconnection valve.

14. The disconnection valve as set forth in claim 8, wherein a source of the external pressure (P0) acting in said first chamber (41) defined in said second bore (39) is the atmospheric pressure, whereby said resulting ratio (R) is invariable and corresponds to the ratio between the cross sections of the first (38) and second (39) bores.

15. The disconnection valve as set forth in claim 1, wherein when one braking pedal only is operated, only the rear wheel on a corresponding side of a vehicle is operated, whereas the front wheel on the corresponding side of the vehicle, the vehicle wheels on an other side of the vehicle, and trailer wheels, are not operated.

16. A valve (VD) intended to disconnect, braking of at least one of front wheels (RAS,RAD) or a trailer (RI), the valve comprising:
- a body (21);
- a first inlet connection (25) and a second inlet connection (24) intended to be connected to two master cylinders (CMS,CMD), each master cylinder (CMS,CMD) being operated by a separate braking pedal (PS,PD), directly controlling braking of one rear wheel (RPS,RPD), and controlling braking of at least one of the front wheels (RAS,RAD) or a braking device of the trailer (RI) when only one braking pedal (PS,PD) is operated; and
- a delivery connection (29) intended to be connected to at least one of a braking circuit of the front wheels (RAS, RAD) or to a trailer brake valve VFR, wherein
- said body (21) has a first bore (38) in which is installed one movable piston (23) subjected to the action of pressure applied to said first inlet connection (25);
- said body (21) comprises a normally closed interception valve (26) closing a communication between said second inlet connection (24) and said delivery connection (29), said interception valve (26) being a ball valve provided with a spring (27) which thrusts the interception valve (26) towards the closure position; and
- said movable piston (23) has a member (28) suitable for operating said interception valve (26) in order to open the interception valve (26) when said movable piston (23) is displaced by the pressure applied to said first inlet connection (25), then allowing communication between said second inlet connection (24) and said delivery connection (29), and therefore allowing application to said delivery connection (29) of pressure present in said second inlet connection (24).

17. A valve (VD) intended to disconnect, braking of at least one of front wheels (RAS, RAD) or a trailer (RI), said valve comprising:
- a body (21);
- a first inlet connection (25) and a second inlet connection (24) intended to be connected to two master cylinders (CMS,CMD), each master cylinder (CMS,CMD) being operated by a separate braking pedal (PS,PD), directly controlling braking of one rear wheel (RPS, RPD), and controlling braking of at least one of the front wheels (RAS,RAD) or a braking device of the trailer (RI) when only one braking pedal (PS,PD) is operated; and
- a delivery connection (29) intended to be connected to at least one of a braking circuit of the front wheels (RAS, RAD) or to a trailer brake valve VFR, wherein
- said body (21) has a first bore (38) in which is installed one first movable piston (23) subjected to the action of pressure applied to said first inlet connection (25);
- said body (21) comprises a normally closed interception valve (26) closing a communication between said second inlet connection (24) and said delivery connection (29);
- a second piston (22) inserted in said body first bore (38), said second piston (22) being fixed by a retainment member and supporting said interception valve (26);
- said movable piston (23) has a member (28) suitable for operating said interception valve (26) in order to open the interception valve (26) when said movable piston (23) is displaced by the pressure applied to said first inlet connection (25), then allowing communication between said second inlet connection (24) and said delivery connection (29), and therefore allowing application to said delivery connection (29) of pressure present in said second inlet connection (24); and
- when one braking pedal only is operated, only the rear wheel on a corresponding side of a vehicle is operated, whereas the front wheel on the corresponding side of the vehicle, the vehicle wheels on an other side of the vehicle, and trailer wheels, are not operated.

18. The disconnection valve as set forth in claim 17, wherein said interception valve (26) is mounted along the displacement direction of said movable piston (23), and said movable piston (23) has the member (28) which is a pin (28) directly acting onto said interception valve (26) for opening the interception valve (26).

* * * * *